(12) United States Patent
Kleijn

(10) Patent No.: US 8,295,762 B1
(45) Date of Patent: *Oct. 23, 2012

(54) DISTRIBUTED BLIND SOURCE SEPARATION

(75) Inventor: Willem Bastiaan Kleijn, Lower Hutt (NZ)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,881

(22) Filed: Sep. 26, 2011

Related U.S. Application Data

(63) Continuation of application No. 13/187,998, filed on Jul. 21, 2011.

(60) Provisional application No. 61/488,635, filed on May 20, 2011.

(51) Int. Cl.
- *H04H 20/71* (2008.01)
- *H04B 7/15* (2006.01)
- *H04W 4/00* (2009.01)
- *H04W 24/00* (2009.01)

(52) U.S. Cl. .............. 455/11.1; 455/426.1; 455/464; 455/513; 455/67.11; 455/422.1; 455/67.1

(58) Field of Classification Search ........... 455/426.1, 455/464, 513, 67.11
See application file for complete search history.

(56) References Cited

U.S. PATENT DOCUMENTS

| | | | |
|---|---|---|---|
| 7,184,777 B2 | 2/2007 | Diener et al. | |
| 7,378,953 B2 * | 5/2008 | Coronel et al. | 340/539.1 |
| 7,392,053 B1 * | 6/2008 | Conner et al. | 455/445 |
| 7,590,611 B2 * | 9/2009 | Hur et al. | 706/52 |
| 8,014,523 B2 * | 9/2011 | Naslund | 380/44 |
| 8,121,653 B2 * | 2/2012 | Marti et al. | 455/567 |
| 8,135,128 B2 * | 3/2012 | Marti et al. | 379/372 |
| 2004/0246900 A1 * | 12/2004 | Zhang et al. | 370/238 |
| 2007/0127704 A1 * | 6/2007 | Marti et al. | 379/373.01 |
| 2008/0240427 A1 * | 10/2008 | Naslund | 380/44 |

OTHER PUBLICATIONS

A. Ozerov et al., "Multichannel Nonnegative Matrix Factorization in Convolutive Mixtures for Audio Source Separation," IEEE Transactions on Audio, Speech, and Language Processing, vol. 18, No. 3, Mar. 2010, pp. 550-563.

C. Savarese, "Location in Distributed Ad-Hoc Wireless Sensor Networks," Proceedings IEEE International Conference on Acoustics, Speech, and Signal Processing, 2001, vol. 4, pp. 2037-2040.

(Continued)

*Primary Examiner* — Tilahun B Gesesse
(74) *Attorney, Agent, or Firm* — Birch, Stewart, Kolasch & Birch, LLP

(57) ABSTRACT

Systems and methods for using distributed processing in conjunction with blind source separation techniques for signal processing and acquisition in sensor network environments are provided. In the distributed blind source separation framework, sensors each perform some processing of sensor signals rather than transmitting such signals over long distances, and/or outside of the sensor network, to be processed at a central location. Sensors attempt to own a source signal, which can only be owned by one active sensor. Sensors owning a source signal broadcast the signal directly or indirectly so it is perceived by users. Sensors receive information from other sensors in their sensor neighborhood, including observed signals of the other sensors and the estimated source signals of sources owned by the other sensors. This allows owning sensors to extract the respective source signals of the sources they own and all redundant sensors to check for any non-owned source signals present.

19 Claims, 4 Drawing Sheets

OTHER PUBLICATIONS

E.R. Arnuncio et al, "Blind source separation of acoustic mixtures with distributed microphones", Proc. IEEE Int. Acoust., Speech, and Signal Proc., 2007, vol. 3, pp. 949-952.

F. Nesta et al., "Cooperative Wiener-ICA for Source Localization and Separation by Distributed Microphone Arrays," Proc. IEEE Int. Conf. Acoust., Speech, and Signal Proc., 2010, pp. 1-4.

J.P. Dmochowski et al., "Blind source separation in a distributed microphone meeting environment for improved teleconferencing", Proc. IEEE Int. Conf. Acoust., Speech, and Signal Proc., 2008, pp. 89-92.

T. Ono et al., "Blind Source Separation with Distributed Microphone Pairs Using Permutation Correction by Intra-Pair TDOA Clustering," Proc. Int. Workshop Acoustic and Noise Control (IWAENC), 2010.

Z. Liu, "Sound source separation with distributed microphone arrays in the presence of clock synchronization errors," Proc. Int. Workshop Acoustic Echo and Noise Control (IWAENC), 2008.

* cited by examiner

DISTRIBUTED BLIND SOURCE SEPARATION

The present application is a Continuation of copending Application No. 13/187,998 filed on Jul. 21, 2011 which claims priority to U.S. Provisional Patent Application Ser. No. 61/488,635, filed May 20, 2011, the entire disclosure of which is hereby incorporated by reference.

FIELD OF THE INVENTION

The present disclosure generally relates to systems and methods for signal processing. More specifically, aspects of the present disclosure relate to processing techniques used in conjunction with blind source separation.

BACKGROUND

Blind source separation assumes that P independent sources are observed by Q sensors. The sources may be audio or sound sources, such as humans talking, music playing, etc., and the sensors may be microphones. Blind source separation finds the independent sources without knowledge of the spatial geometry of the environment and without calibration of the sensors. In conventional systems and approaches to blind source separation, all sensor signals are sent to a central location (sometimes referred to as a "fusion center") for processing. As a result, conventional systems are not scalable; there is a limit to the number of sensors that may be implemented because (1) the transmission power required to send all the sensor signals from the sensor network to the fusion center, and (2) the fusion center has limited compute power.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for processing signals in a sensor network, the sensor network including a plurality of sensors each sensor being in a state of an owning sensor or non-owning sensor, the method comprising: establishing, by a non-owning sensor in the network, a neighborhood of owning sensors, each of the owning sensors owning a specific source signal from amongst a plurality of source signals generated from sources; obtaining, by the non-owning sensor, signal information from the owning sensors in the neighborhood of owning sensors; determining by the non-owning sensor, based on the signal information, whether a source signal from amongst a plurality of source signals generated from the sources is unowned; and taking ownership of the unowned source signal by the non-owning sensor.

In another embodiment of the disclosure, the method for processing signals further comprises determining, based on the observations, all source signals of a plurality of source signals generated from the sources are owned; and in response to determining that all of the source signals are owned, the non-owning sensor deactivating.

In another embodiment of the disclosure, the method for processing signals further comprises comparing a signal reception strength of an owning sensor over a specific source signal owned by the owning sensor with a signal reception strength of the non-owning sensor over the specific source signal; and based on the comparison of the signal reception strengths, the non-owning sensor taking ownership of the specific source signal.

Another embodiment of the disclosure relates to a method for processing signals in a sensor network, the sensor network including a plurality of sensors each sensor being in a state of an owning sensor or non-owning sensor, the method comprising: updating, by an owning sensor, a sensor neighborhood of the owning sensor, the sensor neighborhood including other owning sensors each owning a specific source signal from amongst a plurality of source signals generated from sources; acquiring, by the owning sensor, processed and unprocessed signal information from the other owning sensors in the updated sensor neighborhood; extracting, by the owning sensor, the specific source signal owned by the owning sensor; and transmitting by the owning sensor, a communication to the updated sensor neighborhood, the communication including the extracted source signal and a sensor signal of the owning sensor.

In another embodiment of the disclosure, extracting the specific source signal in the method for processing signals includes estimating the specific source signal owned by the owning sensor.

In another embodiment of the disclosure, estimating the specific source signal in the method for processing signals includes: analyzing, by the owning sensor, sequentially overlapping windowed multi-channel signal segments for a plurality of signals in the updated sensor neighborhood; and identifying, from separated source signal sets computed for the sequentially overlapping signal segments, corresponding source signals to obtain an estimate of the specific source signal owned by the owning sensor across sequential signal segments.

In yet another embodiment of the disclosure, the method for processing signals further comprises the owning sensor transitioning to the non-owning state in response to determining a strength of ownership over the specific source signal owned by the owning sensor is below a threshold level.

In still another embodiment of the disclosure, the method for processing signals further comprises determining a signal reception strength of the owning sensor for the specific source signal owned by the owning sensor; comparing the signal reception strength of the owning sensor with a signal reception strength of a non-owning sensor for the specific source signal; and deactivating the owning sensor based on the comparison of the signal reception strengths.

In another embodiment of the disclosure, the method for processing signals further comprises the owning sensor broadcasting the extracted source signal owned by the owning sensor directly or via a relay node over a radio network to a user.

Another embodiment of the present disclosure relates to a distributed blind source separation system comprising: a plurality of sensors in communication over a first network, each of the plurality of sensors configured to: observe a signal at a location of the plurality of sensors, use the observed signal to estimate a source signal generated by a source at the location, transmit a communication indicating the estimated source signal and a sensor signal to one or more other sensors of the plurality, the sensor signal being particular to the transmitting sensor, and broadcast the estimated source signal over a second network to a user.

In another embodiment of the disclosure, each of the plurality of sensors of the distributed blind source separation system includes a sensor observation transmission unit configured to transmit a communication indicating an estimated source signal and a sensor signal to the one or more other sensors of the plurality; a neighborhood communication acquisition unit configured to acquire transmitted communications from other sensors of the plurality; and a sensor observation acquisition unit configured to acquire signal information at the location of the plurality of sensors.

Another embodiment of the present disclosure relates to a system of communicating sensors for extracting a plurality of source signals from a plurality of sensor observations, the system comprising: a plurality of sensors having computational ability for processing, wherein at least one sensor of the plurality is configured to compute sensor-processed information using observation information and previous sensor-processed information, the previous sensor-processed information being communicated by at least one other sensor of the plurality, at least one sensor of the plurality is configured to communicate at least one extracted source signal to a user node, and the computed sensor-processed information for at least one sensor of the plurality includes a separated source signal or an approximation of a separated source signal.

In other embodiments of the disclosure, the methods and systems described herein may optionally include one or more of the following additional features: the signal information from the owning sensors include extracted source signals and sensor signals from each of the owning sensors in the neighborhood; the extracted source signals are estimates of the source signals generated from the sources; each of the owning sensors broadcasts the specific source signal to a plurality of sensors in the network; each of the owning sensors broadcasts the specific source signal directly or via a relay node over a radio network to a user; the plurality of sensors are local to the sources and the user is remote from the plurality of sensors; the plurality of sensors are local to the sources, and both the plurality of sensors and the sources are local to the user; the acquired processed and unprocessed signal information includes extracted source signals and sensor signals communicated by the other owning sensors in the updated sensor neighborhood; each of the extracted source signals is an estimate of a specific source signal of the plurality generated by the sources; and/or each of the sensor signals includes a measure of reception strength of the specific source signal owned by the other owning sensor.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
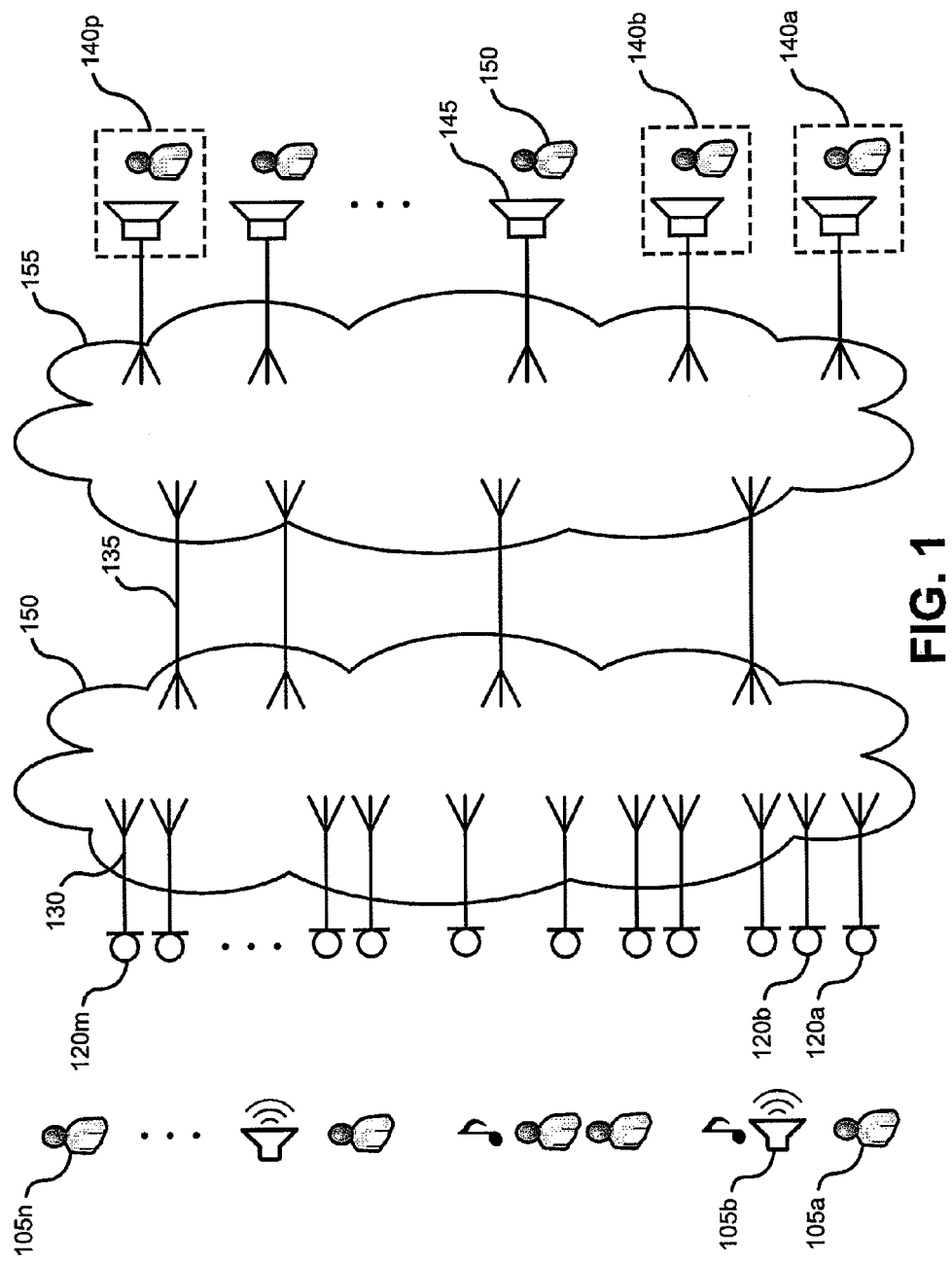
FIG. 1 is a schematic diagram illustrating an example application of distributed blind source separation in an audio signal environment according to one or more embodiments described herein.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Blind source separation aims to extract source signals from a set of observed signals that are mixtures of filtered independent source signals or approximations thereof. Compared to the conventional approach of beam forming, blind source separation has the advantages of not requiring knowledge of sensor location and not requiring sensor calibration. In the context of audio signals, blind source separation assumes that each observed signal can be approximated as a convoluted mixture of source signals. Additionally, the distributed blind source separation system and framework of the present disclosure further assumes that the strength of source signals decays as the distance between sensors and the sources generating the signals increases.

The present disclosure resolves the scalability issues of conventional approaches and systems for blind source separation in the context of sensor networks. As will be described in greater detail herein, the present disclosure resolves these scalability issues by incorporating the notion of distributed processing into blind source separation techniques for signal processing and acquisition in sensor network environments.

Distributed processing of data and information involves spreading computational effort across multiple nodes (e.g., sensors, such as microphones and other similar types of audio capture devices) of a network (e.g., a wireless sensor network). Some advantages of a distributed processing approach to blind source separation include inherent scalability, simple installation, fault tolerance, low energy consumption, reduced transmission requirements, and the ability to use simple hardware components, which can reduce related costs.

Distributed processing is particularly advantageous and effective in scenarios where the information to be processed is generated by sources that are spatially distributed. An example of such a scenario may be a large auditorium occupied by a group of individuals who are carrying-on conversations at various locations throughout the auditorium's floor, where the individuals ("talkers") speaking to each other are considered "sources." In this scenario, where the objectives may include separating and/or enhancing the sources, it is beneficial to perform signal acquisition with an abundance of sensors (e.g., microphones) such that at least some sensors are always in close proximity to the sources. Conventional approaches might utilize a central processing location (sometimes referred to as a "fusion center") and require all the sensors to transmit their observations to the central location where a central processor then passes processed information to an end-user and/or end-user device, such as a hearing instrument worn by normal-hearing or hearing-impaired individuals. In the context of audio signals, an "observation" may be a digital signal (e.g., a digital signal segment) that forms the output of a microphone and an analog-to-digital converter placed in sequence, while "processed information" may include the approximations to the original source signals (e.g., the audio signals generated by the sources (e.g., the "talkers")). In conventional approaches, the central processing location is generally located outside of the sensor network, thus requiring the sensors to transmit signals over long distances.

In the various arrangements described herein, no central processor or fusion center is needed or used. Instead, methods and systems for using distributed processing in conjunction with blind source separation techniques are provided, where the sensors (also more generally referred to herein as "nodes") each perform some processing of sensor signals rather than transmitting such signals over long distances, and/or outside of the sensor network, to be processed at a central location. As will be described in greater detail below, processed information (e.g., approximations of particular source signals extracted by the sensors) may be transmitted directly (e.g., through a relay node or nodes) from the sensors to the end-users and/or end-user devices (e.g., normal-hearing or hearing-impaired individuals, and/or hearing instruments worn by such persons).

Audio signal processing is used herein as an example context in which various aspects and embodiments of the present disclosure are described. Although audio signal processing provides the basis for describing distributed processing for distributed signal acquisition, various other contexts may also be used in addition to or instead of audio signal processing. Example applications in which blind source separation may be used include radio surveillance and radio-based identification, EEG signals, functional magnetic resonance imaging, and facial recognition. Accordingly, the exemplary context of audio signal processing is not in any way intended to limit the scope or application of the present disclosure.

FIG. 1 illustrates an example application for distributed blind source separation in an audio signal transmission environment. The example application shown in FIG. 1 provides a framework for distributed blind source separation that facilitates the use of an unlimited number of sensors 120a, 120b, through 120m (where "m" is an arbitrary number) and independent sources 105a, 105b, through 105n (where "n" is an arbitrary number) without incorporating a central processing location. The sensors 120a, 120b, through 120m are spatially distributed with unknown locations. For example, sensors 120a, 120b, through 120m may be distributed throughout a room, a building or even a city, without the locations of sensors 120a, 120b, through 120m being known or identifiable. In at least some arrangements, sensors 120a, 120b, through 120m are microphones or other audio capture devices configured to capture source signals (e.g., audio signals generated by individuals talking, musical instruments, etc.) generated by sources 105a, 105b, through 105n. For example, in one particular scenario the sensors 120a, 120b, through 120m may be thrown or scattered around a space and come to rest on the floor, tables, chairs, etc., and/or, if the sensors are provided with an adhesive surface, also stick to ceilings and walls of the space. As shown in FIG. 1, each of the sources 105a, 105b, through 105n may be at any location relative to each other as well as to any of the sensors 120a, 120b, through 120m. Some examples of the sources 105a, 105b, through 105n, and the source signals that these sources generate, include individuals (e.g., "talkers") generating speech, musical instruments generating musical notes and sounds, and the like. It should be understood that numerous other types of sensors and sources may also be included as sensors 120a, 120b, through 120m and sources 105a, 105b, through 105n, respectively, in addition to or instead of the examples described above.

In the arrangement illustrated, each of sensors 120a, 120b, through 120m may include an antenna 130, which may be attached to or included within each of sensors 120a, 120b, through 120m. The antenna 130 may be of any type capable of facilitating the transmission of observed sensor input signals and separated source signals from sensors 120a, 120b, through 120m to sensor radio network 150. In one or more arrangements, sensor radio network 150 is a network medium that carries observed sensor input signals and separated source signals between sensors 120a, 120b, through 120m. In one example, observed sensor input signals and/or separated source signals may be broadcast over sensor radio network 150 in the form of data packets that can be received by sensors 120a, 120b, through 120m. Such data packets could be broadcast by a sensor over sensor radio network 150 with a signal strength at least sufficient for reception by other sensors that have the broadcasting sensor as part of their neighborhood.

Additionally, sensor radio network 150 may pass separated source signals received from the sensors 120a, 120b, through 120m to radio broadcast network 155 via one or more broadcast nodes 135. In some embodiments, broadcast nodes (e.g., out-of-network broadcast nodes) 135 may be integrated within sensors 120a, 120b, through 120m, while in other embodiments the broadcast nodes may be physically separate relay nodes. In one or more other embodiments, radio broadcast network 155 is a network medium that carries separated source signals transmitted from broadcast nodes 135 to user nodes 140a, 140b, through 140p (where "p" is an arbitrary number). User nodes 140a, 140b, through 140p may be an end-user device 145, such as a hearing aid or similar type of hearing instrument utilized by an end-user 150, such as a normal-hearing or hearing-impaired individual. In one or more other examples, user nodes 140a, 140b, through 140p may additionally and/or alternatively include interfaces to voice communication networks. In any of these examples, the radio broadcast network 155 may be an existing wireless network (e.g., a wireless local area network (WLAN)). Alternatively, the radio broadcast network 155 may be a low-delay digital radio network configured for broadcasting separated source signals to user nodes designed to receive such signals over the network.

In at least one embodiment of the distributed blind source separation system described herein, each sensor (e.g., sensors 120a, 120b, through 120m) attempts to "own" a source signal (e.g., a signal generated by one of the sources 105a, 105b, through 105n). Other than short time periods associated with the initiation or ownership hand-over of source signals, only one sensor can own a source signal at any given time.

In describing various aspects of the present disclosure the concept of "neighborhood" is used in multiple ways. For example, embodiments described herein assume that sources (also referred to herein as "signal sources" as they generate the signals owned by the sensors) are used (e.g., acquired, picked-up, etc.) or, stated differently, the signals generated by the sources are used, only by sensors located in a "spatial neighborhood". As used herein, "spatial neighborhood" (which may also be referred to as "spatial region") refers to the physical area in which sources are used and which results from the natural attenuation of sound over distance. Another aspect of the present disclosure relates to a "sensor neighborhood," which refers to a collection or group of sensors from which information (e.g., signal information) is used for processing by a given sensor. As will be described in greater detail below, each sensor has a "sensor neighborhood" that is likely to be uniquely defined for that particular sensor. Sensors may use only the received information from sensors in their sensor neighborhood and discard any information received from sensors that are not in their sensor neighborhood. The information received from each other sensor in the sensor neighborhood may include the observed signal of the other sensor, its reception strength, and the estimated source signal of the source owned by the other sensor. Out of necessity, the transmitted source signals may be subject to a delay. This allows all owning sensors to extract (e.g., estimate or approximate) the respective source signals associated with the sources they own. A further delay may also be imposed to allow the owning and redundant (e.g., non-owning) sensors to check the ownership status (e.g., owned or unowned) of the signals. The non-owning sensors may perform this check on an intermittent basis to conserve power.

The power consumed by the system is approximately proportional to the number of sources and not to the number of sensors. For example, if there were thousands of microphones stuck to the ceiling, only a small number of microphones are active (e.g., own a source) at any one time and any one microphone is expendable.

At least one embodiment of the present disclosure relates to a distributed processing method for the separation of source signals (e.g., signals from sources $105a$, $105b$, through $105n$ shown in FIG. 1) from signals observed by spatially distributed sensors with unknown location (e.g., sensors $120a$, $102b$, through $120m$ shown in FIG. 1). In one example, the method is configured for use in wireless sensor networks. As will be further described herein, the method uses distributed processing in combination with blind source separation techniques and algorithms to provide scalability in the number of sensors that may be utilized. In one or more examples, the terms "sensor" and "node" are sometimes used interchangeably to refer to a sensor configured to own a source signal and communicate the extracted source signal and its sensor signal to a "neighborhood" comprised of other sensors and/or sources. In one or more other examples, a node may refer to an out-of-network broadcast node, which may or may not be integrated within a network sensor. Additionally, a network sensor may include a processor or central controller for coordinating various functionalities of the sensor and managing interactions and timing considerations among components of the sensor.

In one embodiment described herein, the method utilizes principles of distributed processing in conjunction with blind source separation according to the following algorithmic rules: (i) each node (e.g., a sensor, such as sensors $120a$, $102b$, through $120m$ shown in FIG. 1) attempts to "own" one source signal (e.g., a signal from any one of sources $105a$, $105b$, through $105n$ shown in FIG. 1); (ii) a source signal can be owned by only one active node; and (iii) active nodes (e.g., nodes or sensors that own a source signal) broadcast an owned source signal so that the source signal is perceived by a user (e.g., via an end-user device such as a hearing instrument or hearing aid).

In some arrangements, sensors that do not own a source signal (e.g., "redundant", "non-owning nodes" or "non-owning sensors" as sometimes referred to herein) do not broadcast source signals to end-users or end-user devices and/or communicate information to neighboring nodes. Instead, these non-owning sensors intermittently check if an un-owned source signal has appeared in their sensor neighborhood, thereby conserving energy. In other arrangements, non-owning sensors may be designated as relay nodes or sensors, such that sensors that own source signals (also referred to herein as "owning nodes," "owning sensors," and "source-owning sensors") may transfer their extracted source signals to one or more of the designated transmitting sensors for transmission to end-users and/or end-user devices.

The distributed processing blind source separation system and framework described herein may be implemented in a variety of applications. Two example applications include hearing aids and ambient telephony. A common complaint among hearing-aid users is the inability to hear clearly in an environment with many talkers. The distributed blind source separation approach described herein may be implemented with microphone networks that can be installed with negligible effort and can broadcast all voices present in a space or room, which can then be selected by an individual's hearing aid. Additionally, in an ambient telephony system context, the distributed blind source separation approach described herein would allow such a system to follow a talker independently of both the talker's location and other talkers present in the same environment or area.

Problem Formulation

As described above, the aim of blind source separation is to estimate the individual source signals from observing, at each of a set of sensors, a particular sensor input signal that approximates a generally unique convolutive mixture of a set of the source signals. In the illustrative context of acoustic (e.g., sound, audio, etc.) signals, blind source separation assumes that each observed signal can be approximated as a convolutive mixture of source signals. Also, the system and framework for blind source separation in the present disclosure further assumes that the strength of source signals decays as the distance between sensors (e.g., sensors $120a$, $102b$, through $120m$ shown in FIG. 1) and the sources generating the signals (e.g., sources $105a$, $105b$, through $105n$ shown in FIG. 1) increases.

For purposes of describing various aspects and embodiments of the present disclosure, it is necessary to first formulate the problem that the distributed blind source separation system, algorithm and framework described herein is designed to solve. Additionally, the following problem formulation provides a foundation for describing how the convolutive system becomes a multiplicative system.

One or more embodiments of the distributed blind source separation system and algorithm described herein considers an unlimited number of observation signals (as compared to many conventional blind source separation approaches, which only consider a relatively small number of observation signals). One example scenario is the use of thousands or even millions of microphones forming a wireless sensor network across a city or town. In such an example scenario, the system should not be affected by the addition and/or removal of microphones.

In at least the present example, the wireless sensor network includes only one type of sensor node. These sensor nodes are configured to observe a signal (e.g., capture an audio signal using a signal capture device such as a microphone), perform processing on the observed signal to estimate the source signal, broadcast the estimated source signal out of the wireless sensor network, and also communicate information to neighboring nodes. In some arrangements, the communication of information from one sensor node to neighboring sensor nodes may be based on a self-organizing capability of the network.

For the purpose of ease of notation in the following description, the sampled signal may be approximated by a continuous signal. Allowing the set of scalar, continuous-time signals, $\{s_i(t)\}_{i \in I}$, be the independent source signals, in a convolutive mixture, a particular scalar observation signal $x_j(t)$ is then of the form:

$$x_j(t) = \sum_{i \in I} \int_0^\infty g_{ji}(\tau) s_i(t - \tau) d\tau$$

where $g_{ji}(t)$ is the transfer function from source i to sensor j. A Fourier transform may be performed on the above expression to make the problem into a complex instantaneous mixture of the sources. In a practical delay-restricted system, the Fourier transform is approximated by a filter bank, for example, a Gabor transform:

$$X_j(\omega, l) = \sum_{i \in I} G_{ji}(\omega) S_i(\omega, l)$$

where $\omega$ and l denote the labels of frequency bin and frame in time, respectively. For purposes of blind source separation, the samples of the sequences may generally be considered independent and identically distributed. For a particular frame and frequency bin, observations over $|J|$ sensors are written as a random complex vector $X(\omega,l) = [X_1(\omega,l), \ldots, X_{|J|}(\omega,l)]^T$, and similarly the sources as a random complex vector $S(\omega,l) = [S_1(\omega,l), \ldots, S_{|I|}(\omega,l)]^T$. A mixing operation is described by a $|J| \times |I|$ matrix G with elements $G_{ji}$ that relates two random vectors as follows:

$$X(\omega,l) = G(\omega) S(\omega,l)$$

In the above equation, both $G(\omega)$ and $S(\omega,l)$ are unknown. As such, the problem is mathematically ill-posed, and therefore can generally not be solved in a single unique manner. In the exemplary case of independent component analysis (ICA) blind source separation, an objective is defined based on the minimization of the mutual information between the sources, or maximization of non-Gaussianity of the sources. For this particular blind source separation method, it is assumed that the signals are non-Gaussian, which is a requirement for unique separation. While the objective defined above is illustrative and may be functional for some simulations, it does not account for mixing responses that last for more than one window length of the filter bank.

As can be realized from the above description, conventional approaches for blind source separation require the availability of the entire $|J|$ dimensional vector, X, at a centralized processor. The computational effort would grow as $|J|^4$. Furthermore, the transmission power required to communicate the observed signals to a central processor grows linearly with the number of sensors involved in the system. As will be further described herein, a scalable system is created by limiting the computation performed on any single processor and restricting the growth of the transmission power required. Also, the blind source separation problem is not defined in terms of an overall matrix G, as such cannot be computed explicitly.

System Objectives

Given the problem formulation described above, the following is one example of a specific set of objectives that may be defined for scalable blind source separation for a system with an unlimited number of scalar source signals $|I|$ and sensors $|J|$, where each sensor receives a scalar convoluted mixture of the source signals: (1) perform basic blind source separation for non-Gaussian signals: assuming more sensors than signals, the scalable system should extract the sources; (2) computational effort should be constrained for each node: the computational effort per node should not exceed a fixed threshold; and (3) global transmission power for transmitting to user nodes should be linear with the number of sources (and not with the number of network nodes). It should be understood that the above objectives are only examples of some specific objectives that may be defined for a system with the particular characteristics given. Numerous other objectives, both more specific and more general those described above, may also be defined for such a system in addition to or instead of the objectives mentioned.

Distributed Source Separation Paradigm

Given the above-identified objectives, a distributed blind source separation system, algorithm, and framework may be defined and described as follows. In at least one implementation, an ownership rule or principle is used to satisfy the objective of linearity of the number of signals sent to user nodes. Under this ownership rule, only one sensor (e.g., one of sensors 120a, 102b, through 120m shown in FIG. 1) can remain the owner of a particular source (e.g., one of sources 105a, 105b, through 105n shown in FIG. 1), and only the owning sensor broadcasts, either directly or through a relay node, the signal of the source (e.g., the "source signal" as sometimes referred to herein, such as a signal generated by any one of the sources 105a, 105b, through 105n shown in FIG. 1). Each active or "owning" sensor broadcasts the source signal it owns to the user nodes (e.g., via radio broadcast network 155 to user nodes 140a, 140b, through 140p shown in FIG. 1).

Source Signal Detection

In at least some implementations of the present disclosure, sensors (e.g., nodes) that do not have ownership over a source signal are configured to determine if un-owned source signals exist that they can extract and obtain ownership of. For example, a sensor j must determine if the past received source signals owned by sensors in a relevant spatial neighborhood $\{S_i\}_{i \in I_j}$ can account for the observed signal $x_j$ of sensor j (further details regarding a sensor's "neighborhood" are provided below). This determination may be made using a relevant statistical test and appropriate assumptions for the form of the statistics of the source signals. For example, the following deterministic fitting process may be used: if the observed signal can be described as a linear combination of the neighborhood source signals, $$x_j(l) = \sum_{i \in I_j} a_{ji} s_i(l) + \varepsilon_j(l)$$

with a sufficiently small error signal $\varepsilon_j(l)$, then the sensor does not receive any un-owned signals. In the above expression, $x_j$ is the microphone signal of microphone j, $s_i$ are the neighborhood source signals, and $\alpha_{ji}$ specify weighting terms of the linear combination. One example measure is to require that the variance of $\varepsilon(l)$ be below a threshold, $\sigma_\varepsilon^2 < \alpha$, where $\alpha$ is the threshold value. For a block of L frames, the above expression can be written as:

$$x_j = S\alpha_j + \epsilon_j$$

where $x_j=[X_j(l-1), \ldots, X_j(l-L)]^T$, $\alpha_j=[\alpha_1, \ldots, \alpha_{|I_j|}]^T$, and where S is a matrix with columns $\{s_{ij}\}_{j \in J}$, one column for each source signal i that is extracted by the sensors in the sensor neighborhood of sensor j.

Allowing $P_S$ to be the matrix that projects onto the subspace spanned by the columns of S, the criterion to determine whether the observed signal is accounted for is $\|(1-P_S)x_j\|^2 < \alpha L$. Sensors (which, again, may also be referred to as "nodes" or "sensor nodes" in the present disclosure) that have no signal ownership (e.g., non-owning sensors) may perform the signal detection operation described above intermittently, either at set time intervals, prior to or following the occurrence of a particular event, and/or according to various other schedules. Thus, the source signal detection process can be performed at a low-power consumption level. Additionally, the source signal set $I_j$ must include all sources that are active in the spatial neighborhood of sensor j. Various aspects related to a sensor's neighborhood and establishing such neighborhood are described in greater detail below.

Source Signal Estimation

If the other source signals are known, then the remaining signal can be set to the signal $e_j$. We side-step the problems associated with having a large number of sources by assuming that nodes can determine a set of active nodes that includes all active nodes in their spatial neighborhood. This set of active nodes is the sensor neighborhood of the sensor. Although an overestimate of the spatial neighborhood results in a larger sensor neighborhood, and therefore increased computational effort, the basic principles of distributed blind source separation as described herein remain valid, and thus a precise knowledge of the spatial neighborhood is not needed. Active nodes communicate not only the owned signal but also the observed signal to nodes in their sensor neighborhood. To facilitate a causal or implementable system, the observed signals are transmitted ahead of the owned signals. The communication to the neighboring nodes requires low-power, short-range transmission. In contrast, the broadcast of the owned source signal to the user must be performed at sufficient power to reach the relevant user nodes.

Each node now knows the observed signals in its sensor neighborhood and its own observed signal and can perform a blind source separation on these signals. The main requirement for the blind source separation algorithm is that it is consistent between overlapping sensor neighborhoods. In at least one arrangement, this requirement implies that the same source signal found by different sensors differs at most by a complex factor. In one embodiment a conventional ICA based blind-source separation algorithm is used for this purpose.

Spatial Neighborhood Estimation

The neighborhood of a sensor j aims to be a minimal set of sensors $J_j$ that is sufficient to extract the source signals contributing significantly to the signal observed by sensor j. In practical situations where it is difficult to estimate a minimal set, a small set may be selected that is sufficiently large (e.g., there are no disadvantages to including more sensors than are needed). Various tests can be used to select or estimate the neighborhood of sensor j. In one embodiment, based on physical distance and the known rate of decay of the sound amplitude, a spatial radius can be computed for a neighborhood. In other embodiments, the approximate sensor locations can be computed using radio-based sensor location algorithms known by those skilled in the art. Including one or more sensors that are further away (e.g., outside of the spatial radius computed) will increase computation but does not hinder or hurt the source signal estimation procedure. As such, there is no need for precise knowledge of each sensor's location. In one embodiment a correlation coefficient can be used: if at any time the frequency weighted average of $x_j^H x_k$ exceeds a threshold $\beta$, then sensor k is in the neighborhood of sensor j, and vice versa. The strength of radio used for the short-range communication may also be used to estimate the neighbors of sensor j. It is possible to retain this information for the lifetime of the sensors if sensors have a fixed location.

Figure 2:
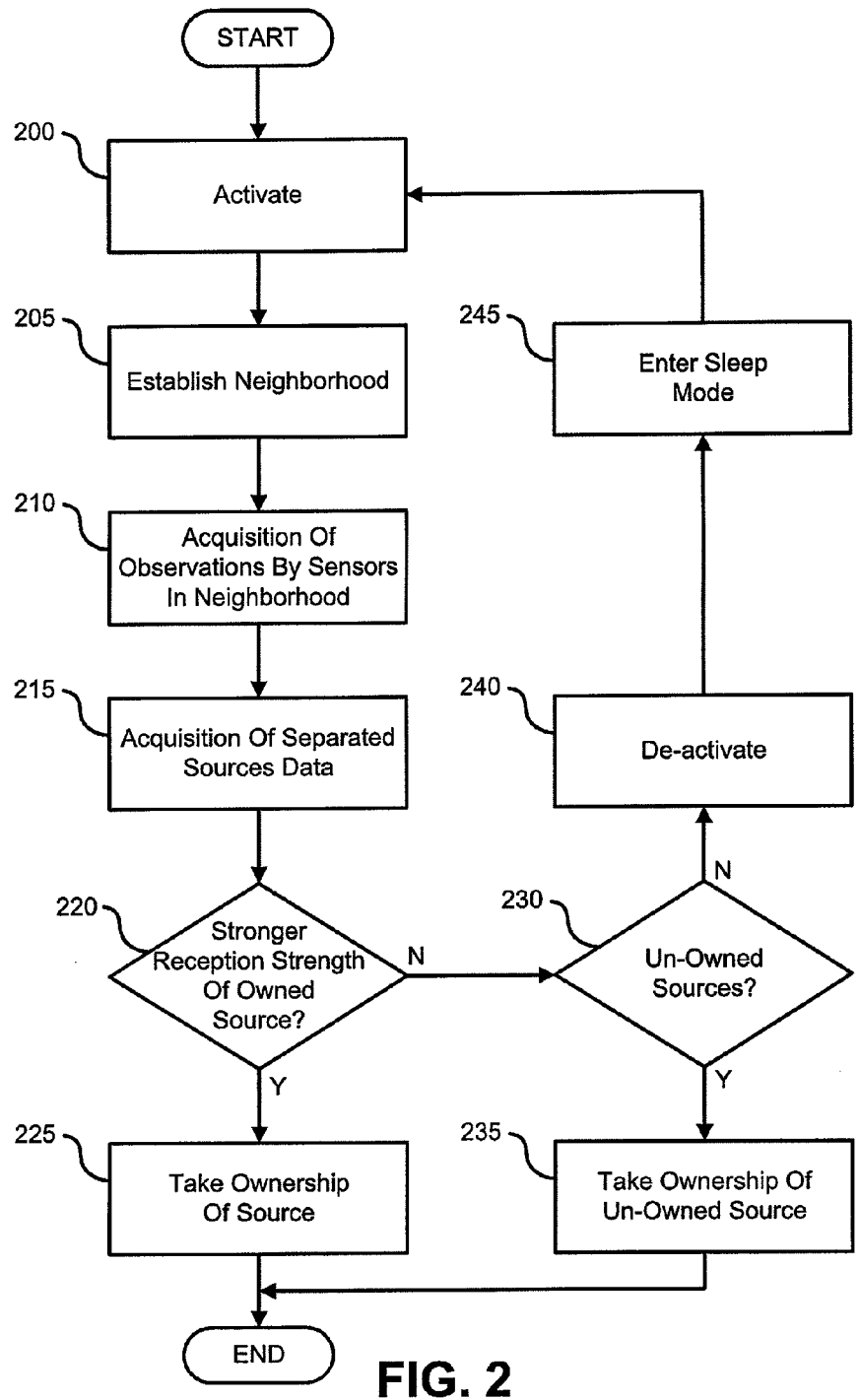
FIG. 2 is a flowchart illustrating an example process for sensor activation when un-owned sources are present according to one or more embodiments described herein.

FIG. 2 illustrates an example process for an individual sensor taking ownership of an un-owned source (e.g., source signal), or taking ownership of a source signal that the individual sensor receives with higher reception strength (e.g., as determined by a threshold) than the current owning sensor, according to one or more embodiments described herein. The process begins in step 200 with the sensor (e.g., one of sensors 120a, 102b, through 120m shown in FIG. 1) being activated. Once the sensor is activated in step 200, in step 205 the sensor's neighborhood is established. In at least some implementations, a sensor's neighborhood includes only active sensors (e.g., sensors that have ownership of a source signal). This is true whether the sensor for which a neighborhood is being established in step 205 is an active (e.g., owning) or inactive (e.g., non-owning) sensor. In one example, establishing the neighborhood of a sensor (referred to as sensor j for purposes of this example) involves determining a minimal set of sensors, $J_j$, sufficient to extract the source signals contributing significantly to the signal observed by sensor j. In step 210, the sensor acquires observations by other sensors in the sensor neighborhood established in step 205.

The process then continues to step 215, where the sensor acquires extracted source signals from the other sensors in the sensor neighborhood. For example, a sensor that has ownership of a source extracts (e.g., estimates or approximates) or tracks the source signal associated with that source. Each owning sensor may transmit an in-network (e.g., sensor network 150 shown in FIG. 1) communication to at least the set of sensors that have the owning sensor in their neighborhood that includes the extracted source signal of the source it owns together with a reception strength for the owned source signal. Accordingly, in step 215, the sensor acquires this data communicated by the owning sensors in its sensor neighborhood.

In step 220, it is determined whether the sensor has a stronger reception strength of an owned source than the owning sensor does. For example, based on the strength of ownership data acquired by the sensor in step 215 as part of the separated sources data, it may be found that the owning sensor's reception strength over the source signal it owns falls below a certain threshold level. In one scenario, this threshold level may involve a clarity measure of the signal being extracted by the owning sensor. If it is determined in step 220 that the sensor has a stronger reception strength for a particular owned source signal than does the signal's current owner, the sensor takes ownership of the source in step 225. However, if in step 220 it is found that the sensor does not have greater reception strength for an owned source in the sensor neighborhood, the process moves to step 230 where it is determined whether there are any un-owned sources present in the neighborhood.

If in step 230 it is determined that an un-owned source is present in the sensor neighborhood, then in step 235 the sensor takes ownership of the un-owned source (e.g., uses, acquires, etc., the source signal from the un-owned source). If it is instead determined in step 230 that no un-owned sources are present in the sensor neighborhood, then the process goes to step 240 where the sensor deactivates (e.g., the sensor's radio turns off). The sensor deactivates in step 240 to conserve energy, and then enters sleep mode in step 245 until the sensor is once again activated in step 200 and the process repeats. In at least some embodiments described herein, when the sensor enters sleep mode in step 245, the sensor may intermittently check to determine whether there are any un-owned source signals present.

Figure 3:
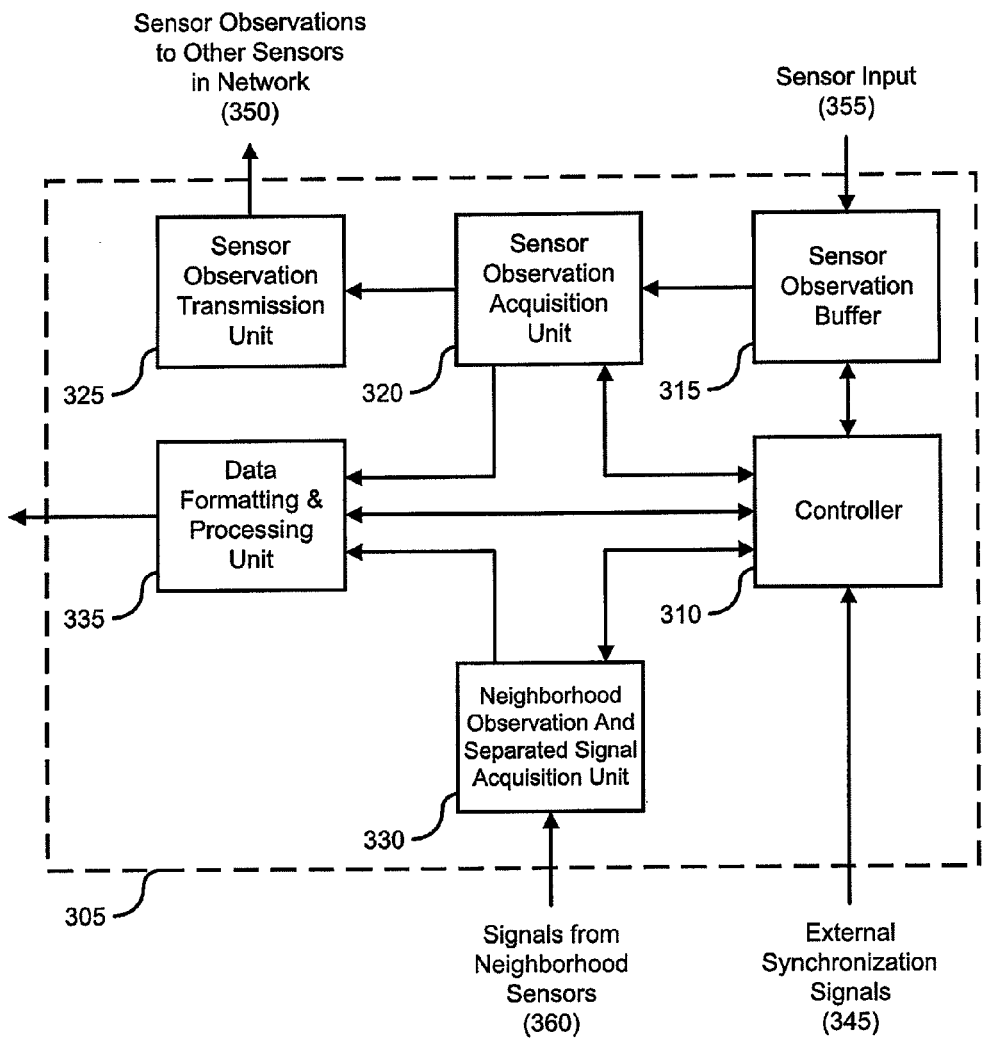
FIG. 3 is a block diagram illustrating an example observation acquisition and transmission unit of a sensor according to one or more embodiments described herein.

FIG. 3 illustrates an example observation acquisition and transmission unit of a sensor (e.g., one of sensors 120a, 102b, through 120m shown in FIG. 1). As shown, an observation acquisition and transmission unit 305, which may be one of numerous parts or components comprising a sensor in any of the various embodiments described herein, includes subunits and components configured to acquire and/or transmit observation data. Examples of data that observation acquisition and transmission unit 305 may acquire include the following: source signals from neighborhood sensors 360, external synchronization signals 345, and sensor input 355. Sensor input 355 is a signal that may have as a component the source signal (e.g., one of sources 105a, 105b, through 105n shown in FIG. 1) owned by the sensor that includes acquisition and transmission unit 305. Sensor observation buffer 315 may be configured to receive and store new observation data, such as sensor input 355, which may be composed of audio signals generated by a source (e.g., a talker, musical instrument, etc.). In some arrangements, sensor observation buffer 315 may continuously accumulate and store the sensor input 355 and provide the sensor input 355 to the sensor data acquisition unit 320 at set intervals (e.g., 5 milliseconds (ms), 10 ms, etc.). Sensor data acquisition unit 320 provides the data for transmission to sensor observation transmission unit 325 and for processing to data formatting and processing unit 335. As will be described in greater detail below, the sensor observation transmission unit 325 transmits the observed data to other sensors. Other sensors that have the sensor containing the observation acquisition and transmission unit 305 as part of their sensor neighborhood use these transmitted observations in their processing.

In some embodiments, the observation acquisition and transmission unit 305 may also include a neighborhood observation acquisition unit 330. The neighborhood observation acquisition unit 330 may be configured to acquire sensor signals from neighboring sensors 360, which includes sensor signals from active sensors in the sensor neighborhood. The neighborhood observation acquisition unit 330 may perform steps 210 and 215 shown in FIG. 2, which includes acquiring separated sources data.

In one or more embodiments, the data formatting and processing unit 335 may be configured to process or format sensor observation data (e.g., sensor input 355, signals from neighborhood sensors 360, sensor observations 350, etc.) to compute the separated signal owned by the sensor containing the observation acquisition and transmission unit 305. The data formatting and processing unit 335 then transmits the processed data to, for example, other sensors that have the sensor containing the observation acquisition and transmission unit 305 as their neighbor. The data formatting and processing unit 335 may also process or format the sensor data such that it can be received by end-users and/or end-user devices (e.g., end-user 150 and end-user device 145, which may be considered all or part of user nodes 140a, 140b, through 140p shown in FIG. 1).

In at least some embodiments described herein, the observation acquisition and transmission unit 305 may also include a controller 310. Controller 310 may be configured for coordinating the exchange of data and information between the various components and units of the observation acquisition and transmission unit 305, and also be configured for managing any timing considerations. For example, the controller 310 may be configured to initiate intermittent checks for un-owned source signals in a sensor's neighborhood when the sensor is inactive (or a non-owning sensor). Additionally, controller 310 may coordinate the transmission of source signals from the observation acquisition and transmission unit 305 to other sensors in the neighborhood when the sensor is an active or owning sensor. Controller 310 may also be further configured to receive external synchronization signals 345 such that the data formatting and processing unit 335 can perform, for example, a time-synchronized discrete Fourier transform (DFT). In at least some embodiments, external synchronization signals 345 may be sent by radio and be used by the controller 310 to synchronize updates, and therefore also synchronize signal blocks.

In some embodiments of the present disclosure, one or more other components, modules, units, etc., may also be included as part of observation acquisition and transmission unit 305, in addition to or instead of those illustrated in FIG. 3. The names used to identify the units and components included as part of observation acquisition and transmission unit 305 (e.g., sensor observation transmission unit, neighborhood observation acquisition unit, etc.) are exemplary in nature, and are not intended to limit the scope of the disclosure in any way.

Figure 4:
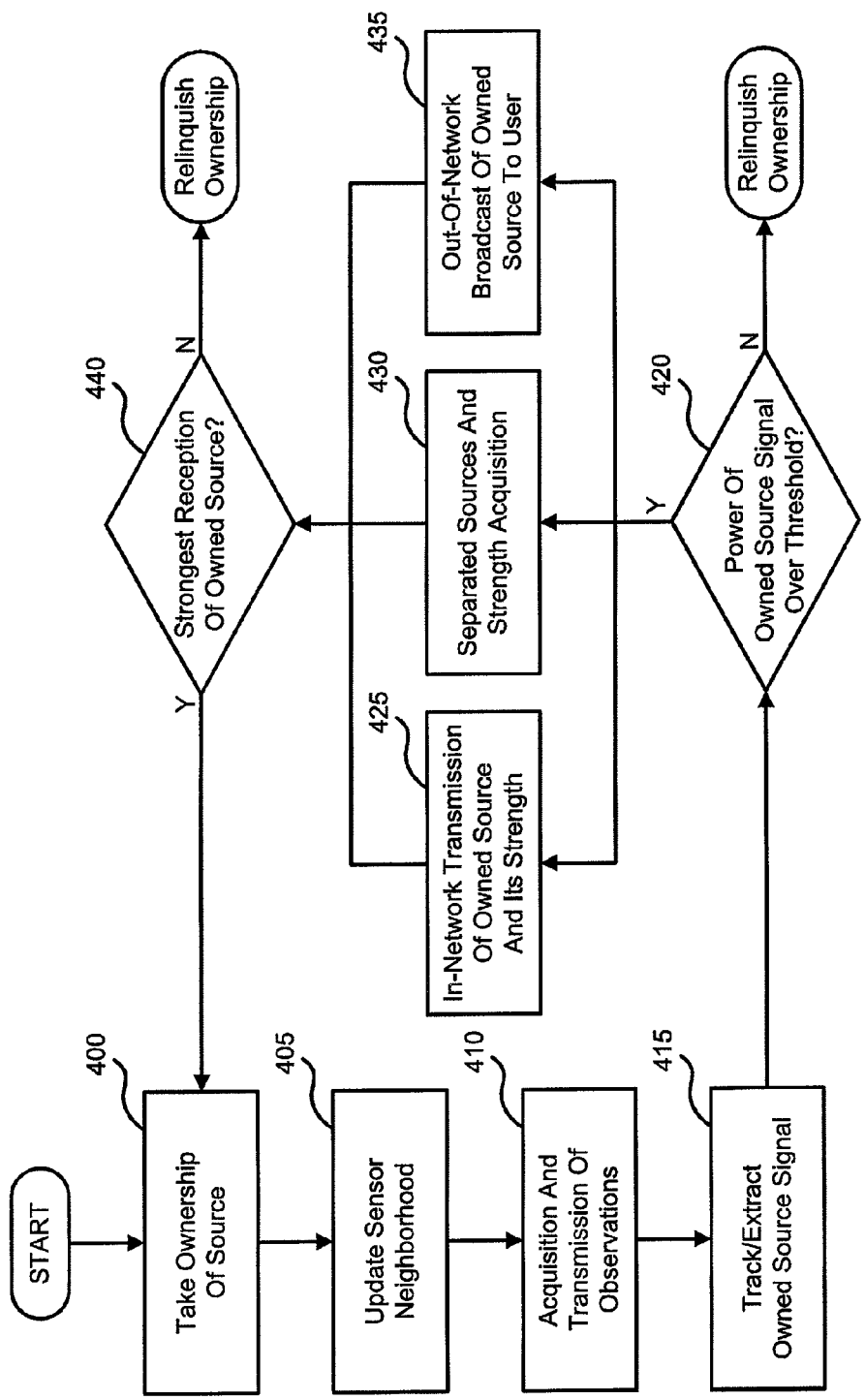
FIG. 4 is a flowchart illustrating an example process for sensor ownership of a source according to one or more embodiments described herein.

FIG. 4 illustrates an example process for a sensor with ownership of a source. As shown, the process begins at step 400 where a sensor (e.g., one of sensors 120a, 102b, through 120m shown in FIG. 1) takes, or in some instances retains, ownership of a source (e.g., uses, acquires, etc., a source signal from one of the sources 105a, 105b, through 105n shown in FIG. 1). In some scenarios the actions included in step 400 may be the result of taking ownership according to step 225 in the process shown in FIG. 2. In describing various features of the disclosure embodied in the remaining steps illustrated in FIG. 4, the sensor that takes ownership of the source in step 400 is referred to as the "source-owning" sensor, which is an exemplary identifier used for purposes of simplification.

In step 405, the source-owning sensor updates its sensor neighborhood. Similar to step 205 of the process illustrated in FIG. 2 and described above, updating the sensor neighborhood of the source-owning sensor in step 405 involves determining a minimal set of sensors sufficient to extract the source signals contributing significantly to the signal observed by the source-owning sensor.

After the source-owning sensor updates its sensor neighborhood in step 405, the process continues to step 410 where the source-owning sensor acquires observations from other sensors in the sensor neighborhood and also acquires and transmits its own observations to other sensors. As described above, other sensors that have the source-owning sensor as part of their sensor neighborhood use the observations transmitted by the source-owning sensor (e.g., using data formatting and processing unit 335 shown in FIG. 3) in their processing. In at least one embodiment, observations acquired from other sensors in the source-owning sensor's neighborhood may include extracted source signals communicated by other source-owning sensors in the sensor neighborhood (e.g., signals from neighborhood sensors 360 received at neighborhood observation acquisition unit 360 shown in FIG. 3), along with sensor signals from such other source-owning sensors.

In step 415, the source-owning sensor extracts (e.g., estimates or approximates) or tracks the source signal associated with the source that the source-owning sensor took ownership of in step 400. In at least one embodiment, the tracking of the source signal associated with the owned source may be performed by the source-owning sensor analyzing strongly overlapping source signal segments subsequently in time, and thereafter identifying the time evolution of each particular source signal.

Following the tracking of the source signal in step 415, the process then continues to step 420 where it is determined whether the reception strength of the source-owning sensor over the owned source signal is above a threshold level. If it is found in step 420 that the strength of the source-owning sensor over the owned source signal falls below the threshold, then the source-owning sensor relinquishes ownership and may deactivate (e.g., the radio of the sensor turns off or powers-down to conserve energy).

If in step 420 it is determined that the strength of the source-owning sensor over the owned source signal meets or exceeds the threshold level of power, then the process continues to one or more of steps 425, 430, and 435, as shown in FIG. 4. In step 425, the source-owning sensor transmits within its sensor neighborhood network a communication indicating the source (e.g., the source signal) that the source-owning sensor has ownership of, along with the reception strength of the owned signal. For example, the source-owning sensor may transmit an in-network (e.g., sensor network 150 shown in FIG. 1) communication to the sensors that have the source-owning sensor in their sensor neighborhood and to redundant sensors in the corresponding spatial neighborhood. This in-network communication includes the extracted (e.g., estimated or approximated) source signal from step 415 together with the sensor signal of the source-owning sensor. As described above, this step allows all inactive or non-owning sensors to check for the presence of any non-owned source signals.

In step 430, the source-owning sensor acquires separated sources and strength information transmitted by other sensors in its sensor neighborhood. In the process illustrated in FIG. 4, step 430 may be considered the complement of step 425. In particular, in step 425 the source-owning sensor transmits certain information to its sensor neighborhood (e.g., information indicating the source (e.g., the source signal) that the source-owning sensor has ownership of, along with a strength of that ownership). In step 430, equivalent information that is transmitted by other sensors in the sensor neighborhood of the source-owning sensor, is received and acquired by the source-owning sensor.

Additionally, in step 435, the source-owning sensor may broadcast the source signal that it owns out-of-network (e.g., via radio broadcast network 155 shown in FIG. 1) to an end-user (e.g., any one of user nodes 140a, 140b, through 140p shown in FIG. 1), which may include an end-user device such as a hearing aid or hearing instrument used by an individual (e.g., end-user device 145 used by end-user 150 shown in FIG. 1). As described above, the out-of-network broadcast may be performed via one or more relay nodes, which, in at least some embodiments, may be designated as relay nodes.

Following any of steps 425, 430, and/or 435, the process illustrated in FIG. 4 continues to step 440, where an assessment is made to determine whether the source-owning sensor that took ownership of the source signal in step 400 still has the strongest (e.g., most powerful) reception of the owned source signal. If so, then the process continues back to step 400 and repeats as described above. However, if in step 440 it is found that one or more sensors other than the source-owning sensor has a stronger reception of the source signal owned by the source-owning sensor, then the source-owning sensor relinquishes ownership and may deactivate, and the source signal becomes a non-owned (e.g., unowned) source signal that may be used (e.g., acquired) by another sensor.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although the disclosure contains many specific implementation details regarding the use of distributed blind source separation, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, although operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for processing signals in a sensor network, the sensor network including a plurality of sensors each sensor being in a state of an owning sensor or non-owning sensor, the method comprising:
    establishing, by a non-owning sensor in the network, a neighborhood of owning sensors, each of the owning sensors owning a specific source signal from amongst a plurality of source signals generated from sources;
    obtaining, by the non-owning sensor, signal information from the owning sensors in the neighborhood of owning sensors;
    comparing, by the non-owning sensor, based on the signal information, a signal reception strength of an owning sensor over a specific source signal owned by the owning sensor with a signal reception strength of the non-owning sensor over the specific source signal; and
    based on the comparison of the signal reception strengths, the non-owning sensor taking ownership of the specific source signal.

2. The method of claim 1, wherein the signal information from the owning sensors include extracted source signals and sensor signals from each of the owning sensors in the neighborhood.

3. The method of claim 2, wherein the extracted source signals are estimates of the source signals generated from the sources.

4. The method of claim 1, wherein each of the owning sensors broadcasts the specific source signal to a plurality of sensors in the network.

5. The method of claim 1, wherein each of the owning sensors broadcasts the specific source signal directly or via a relay node over a radio network to a user.

6. The method of claim 5, wherein the plurality of sensors are local to the sources, and wherein the user is remote from the plurality of sensors.

7. The method of claim 5, wherein the plurality of sensors are local to the sources, and wherein both the plurality of sensors and the sources are local to the user.

8. The method of claim 1, further comprising:
determining, by the non-owning sensor, based on the signal information, that all source signals of a plurality of source signals generated from the sources are owned; and
in response to determining all of the source signals are owned, the non-owning sensor deactivating.

9. The method of claim 1, further comprising:
determining, by the non-owning sensor, based on the signal information, that a source signal of a plurality of source signals generated from the sources is unowned; and
the non-owning sensor taking ownership of the unowned source signal.

10. A method for processing signals in a sensor network, the sensor network including a plurality of sensors each sensor being in a state of an owning sensor or non-owning sensor, the method comprising:
updating, by an owning sensor, a sensor neighborhood of the owning sensor, the sensor neighborhood including other owning sensors each owning a specific source signal from amongst a plurality of source signals generated from sources;
acquiring, by the owning sensor, processed and unprocessed signal information from the other owning sensors in the updated sensor neighborhood;
analyzing, by the owning sensor, sequentially overlapping windowed multi-channel signal segments for a plurality of signals in the updated sensor neighborhood;
identifying, from separated source signal sets computed for the sequentially overlapping signal segments, corresponding source signals to obtain an estimate of the specific source signal owned by the owning sensor; and
transmitting by the owning sensor, a communication to the updated sensor neighborhood, the communication including the estimate of the specific source signal owned by the owning sensor and a sensor signal of the owning sensor.

11. The method of claim 10, wherein the acquired processed and unprocessed signal information includes estimated source signals and sensor signals communicated by the other owning sensors in the updated sensor neighborhood.

12. The method of claim 11, wherein each of the estimated source signals is an estimate of a specific source signal of the plurality generated by the sources, and wherein each of the sensor signals includes a measure of reception strength of the specific source signal owned by the other owning sensor.

13. The method of claim 10, further comprising the owning sensor transitioning to the non-owning state in response to determining a strength of ownership over the specific source signal owned by the owning sensor is below a threshold level.

14. The method of claim 10, further comprising:
determining a signal reception strength of the owning sensor for the specific source signal owned by the owning sensor;
comparing the signal reception strength of the owning sensor with a signal reception strength of a non-owning sensor for the specific source signal; and
deactivating the owning sensor based on the comparison of the signal reception strengths.

15. The method of claim 10, further comprising the owning sensor broadcasting the estimate of the source signal owned by the owning sensor directly or via a relay node over a radio network to a user.

16. The method of claim 15, wherein the sources are local to the owning sensor, and wherein the user is remote from the owning sensor.

17. The method of claim 15, wherein the sources are local to the owning sensor, and wherein both the sources and the owning sensor are local to the user.

18. A distributed blind source separation system comprising:
a plurality of sensors in communication over a first network, each of the plurality of sensors configured to:
observe a signal at a location of the plurality of sensors,
use the observed signal to estimate a source signal generated by a source at the location,
transmit a communication indicating the estimated source signal and a sensor signal to one or more other sensors of the plurality, the sensor signal being particular to the transmitting sensor, and
broadcast the estimated source signal over a second network to a user.

19. The distributed blind source separation system of claim 18, wherein each of the plurality of sensors includes:
a sensor observation transmission unit configured to transmit a communication indicating an estimated source signal and a sensor signal to the one or more other sensors of the plurality;
a neighborhood communication acquisition unit configured to acquire transmitted communications from other sensors of the plurality; and
a sensor observation acquisition unit configured to acquire signal information at the location of the plurality of sensors.

* * * * *